United States Patent
Müller

(10) Patent No.: US 9,254,594 B2
(45) Date of Patent: Feb. 9, 2016

(54) MULTILAYER LAMINATED MATERIAL HAVING AT LEAST ONE GLASS LAYER

(75) Inventor: Klaus Müller, Sulzbach (DE)

(73) Assignee: Basell Poliolefine Italia S.r.l., Milan (IT)

( * ) Notice: Subject to any disclaimer, the term of this patent is extended or adjusted under 35 U.S.C. 154(b) by 727 days.

(21) Appl. No.: 12/448,159

(22) PCT Filed: Dec. 12, 2007

(86) PCT No.: PCT/EP2007/010910
§ 371 (c)(1),
(2), (4) Date: Jun. 11, 2009

(87) PCT Pub. No.: WO2008/074430
PCT Pub. Date: Jun. 26, 2008

(65) Prior Publication Data
US 2009/0311458 A1    Dec. 17, 2009

Related U.S. Application Data

(60) Provisional application No. 60/901,074, filed on Feb. 13, 2007.

(30) Foreign Application Priority Data

Dec. 19, 2006   (DE) .......................... 10 2006 060 459

(51) Int. Cl.
| | |
|---|---|
| B29C 45/14 | (2006.01) |
| B29C 70/06 | (2006.01) |
| B32B 15/08 | (2006.01) |
| B32B 17/06 | (2006.01) |
| B32B 27/32 | (2006.01) |
| C03C 17/32 | (2006.01) |
| B32B 5/02 | (2006.01) |
| B32B 17/04 | (2006.01) |
| B32B 17/10 | (2006.01) |
| B32B 25/08 | (2006.01) |
| B32B 27/12 | (2006.01) |
| B32B 27/20 | (2006.01) |
| C08L 23/14 | (2006.01) |
| B29K 221/00 | (2006.01) |
| B29K 705/00 | (2006.01) |
| B29K 709/08 | (2006.01) |
| B29L 31/30 | (2006.01) |

(52) U.S. Cl.
CPC ..... *B29C 45/14467* (2013.01); *B29C 45/14811* (2013.01); *B32B 5/02* (2013.01); *B32B 15/08* (2013.01); *B32B 17/04* (2013.01); *B32B 17/06* (2013.01); *B32B 17/067* (2013.01); *B32B 17/10018* (2013.01); *B32B 25/08* (2013.01); *B32B 27/12* (2013.01); *B32B 27/20* (2013.01); *B32B 27/32* (2013.01); *C03C 17/328* (2013.01); *C08L 23/142* (2013.01); *B29C 45/14508* (2013.01); *B29C 2045/14532* (2013.01); *B29K 2221/003* (2013.01); *B29K 2705/00* (2013.01); *B29K 2709/08* (2013.01); *B29K 2713/00* (2013.01); *B29K 2715/006* (2013.01); *B29L 2031/30* (2013.01); *B32B 2272/00* (2013.01); *B32B 2311/00* (2013.01); *B32B 2323/10* (2013.01); *B32B 2323/16* (2013.01); *B32B 2375/00* (2013.01); *B32B 2377/00* (2013.01); *B32B 2605/08* (2013.01); *Y10T 428/266* (2015.01); *Y10T 428/269* (2015.01); *Y10T 428/27* (2015.01); *Y10T 428/31507* (2015.04); *Y10T 428/31551* (2015.04); *Y10T 442/3854* (2015.04); *Y10T 442/59* (2015.04); *Y10T 442/674* (2015.04)

(58) Field of Classification Search
CPC .................. B29C 45/14467; B29C 45/14811; B32B 27/20; B32B 25/08; B32B 27/32; B32B 27/12; B32B 17/04; B32B 5/02; B32B 17/067; B32B 17/06; B32B 17/10018; B32B 15/08; C03C 17/328; C08L 23/142; Y10T 428/27
USPC .......................................................... 428/38
See application file for complete search history.

(56) References Cited

U.S. PATENT DOCUMENTS

| | | | | |
|---|---|---|---|---|
| 3,945,975 | A | * | 3/1976 | Strack ........................... 524/526 |
| 4,151,137 | A | | 4/1979 | Duvdevani et al. |
| 4,427,743 | A | | 1/1984 | Katsuki et al. |
| 4,824,722 | A | | 4/1989 | Jarrett |
| 5,519,100 | A | | 5/1996 | Ewen et al. |
| 5,561,092 | A | | 10/1996 | Ewen et al. |
| 5,591,795 | A | * | 1/1997 | Nomura et al. ............... 524/451 |
| 5,667,896 | A | * | 9/1997 | Carter et al. ............... 428/425.6 |

(Continued)

FOREIGN PATENT DOCUMENTS

| | | |
|---|---|---|
| DE | 19529240 A1 | 2/1997 |
| EP | 178062 A2 * | 4/1986 |

(Continued)

*Primary Examiner* — Laura Auer

(57) ABSTRACT

A multilayer laminated material which comprises at least one layer of glass and which has improved thermal stability is distinguished in that it comprises a lower substrate layer of a plastic, a metal or a combination of plastic and metal, an intermediate layer arranged thereon and comprising a soft material or comprising a thermoplastic, a further fibrous intermediate layer comprising plastic, which is provided with a solvent-free adhesive material, and a top layer of glass. The multilayer laminated material is suitable for the installation of glass elements in the area of the electrical, the electronics and the automotive industry and for other industrial applications.

15 Claims, No Drawings

(56) References Cited

U.S. PATENT DOCUMENTS

| | | |
|---|---|---|
| 6,565,969 B1 * | 5/2003 | Lamon et al. .................. 428/349 |
| 2001/0051260 A1 * | 12/2001 | Johnson et al. ............. 428/317.7 |
| 2004/0108623 A1 * | 6/2004 | Deeter et al. .............. 264/331.12 |
| 2004/0198919 A1 * | 10/2004 | Pelliconi et al. ........... 525/333.7 |
| 2005/0091935 A1 | 5/2005 | Amano et al. |
| 2005/0170191 A1 | 8/2005 | Huchet |
| 2009/0291291 A1 * | 11/2009 | Epple ........................ 428/317.3 |

FOREIGN PATENT DOCUMENTS

| | | |
|---|---|---|
| EP | 844280 | 5/1998 |
| GB | 1369285 | 10/1974 |
| JP | 63054218 | 3/1988 |
| WO | WO-0047401 | 8/2000 |
| WO | WO-2008067949 | 6/2008 |

* cited by examiner

MULTILAYER LAMINATED MATERIAL HAVING AT LEAST ONE GLASS LAYER

CROSS-REFERENCE TO RELATED APPLICATIONS

This application is the U.S. national stage under 35 U.S.C. §371 of International Application PCT/EP2007/010910, filed Dec. 12, 2007, claiming priority to German Patent Application No. 10 2006 060 459.8, filed Dec. 19, 2006, and provisional U.S. Appl. No. 60/901,074, filed Feb. 13, 2007; the disclosures of International Application PCT/EP2007/010910, German Patent Application No. 10 2006 060 459.8, and provisional U.S. Appl. No. 60/901,074, each as filed, are incorporated herein by reference.

The present invention relates to a novel multilayer laminated material which comprises at least one layer of glass and which is insensitive to stress or distortion differences as usually occur in the case of temperature variations. Such stress or distortion differences usually result in a considerable load on the glass layers, in particular in the region where the glass is directly in contact with other materials, until destruction occurs unless effective countermeasures are taken.

The invention furthermore relates to a process for the production of this multi-layer laminated material and its use for the production of components for the electrical, the electronics or the automotive industry and for other industrial applications.

Many laminated materials which are known in the prior art and consist of different materials firmly bonded to one another have the disadvantage that, particularly in the case of bonding of the different materials to one another on one side, such as bonding metal or plastic, whether of the thermoplastic or thermosetting type, to glass, temperature changes result in stress effects which in the end lead to a high mechanical load on the glass layer until it breaks. The danger of destruction with the laminated materials affects the use of such materials for the intended purpose in a very disadvantageous manner, particularly when the laminated materials are subject to temperature variations, or even makes it completely impossible.

For numerous industrial applications, for example in the automotive industry or in the electrical industry, there is therefore still an urgent need for multilayer laminates which comprise at least one glass layer and are nevertheless insensitive to temperature variations over a wide range, which are also free of solvents, which have high mechanical strengths in combination with high bond strength and which on the other hand can also be produced easily and economically. A special application for such laminate is the outer edge of a glass window in an automotive vehicle, where the glass is fixed by a frame with the car body.

The object of the invention was therefore to produce a multilayer laminate which comprises at least one glass layer and is resistant to temperature variations, which maintains this resistance over a wide temperature range and a long duration and which also fulfills the other expectations of industry with regard to the mechanical properties and the possibility of environmentally friendly disposal.

This object is achieved by a multilayer laminated material which is free of solvents and which comprises a lower substrate layer of a plastic or of a metal, an intermediate layer arranged thereon and comprising a soft material or comprising a thermoplastic, a further fibrous intermediate layer comprising plastic, which is provided with an adhesive material, and a top layer of glass.

The multilayer laminate according to the invention which has this composition surprisingly shows not the slightest signs of stress, such as cracks or chips, even after being repeatedly exposed to temperatures of about 150° C. over a duration of up to 40 days. In a preferred embodiment of the instant invention the laminate is surrounding the glass layer at its outer edge as a frame.

The lower substrate layer may comprise a thermoplastic or a thermosetting plastic. Alternatively, it may also consist of metal or may be a combination of plastic and metal.

The lower substrate layer of plastic may comprise from 1 to 60% by weight, preferably from 5 to 50% by weight, particularly preferably from 10 to 40% by weight, based in each case on the weight of the lower substrate layer, of reinforcing fillers. Examples of such reinforcing fillers are barium sulfate, magnesium hydroxide, talc having a mean particle size in the range from 0.1 to 10 μm, measured according to DIN 66 115, wood, flax, chalk, glass fibers, coated glass fibers, short glass fibers or long glass fibers, glass beads or mixtures of these. In addition, the lower substrate layer may comprise further additives, such as light stabilizers, UV stabilizers and heat stabilizers, pigments, carbon blacks, lubricants and processing assistants, flameproofing agents, blowing agents and the like, in amounts expedient in each case.

According to the invention, polypropylene (PP), polyethylene (PE), polyvinyl chloride (PVC), polysulfones, polyether ketones, polyesters, such as polyethylene terephthalate, polybuthylene terephthalate or polyalkylene naphthalate, polycycloolefins, polyacrylates, polymethacrylates, polyamides, such as poly-epsilon-caprolactam or polyhexamethyleneadipamide or polyhexamethylene-sebacamide, polycarbonate, polyurethanes, polyacetals, such as polyoxymethylene (POM), or polystyrene (PS) are advantageously used as thermoplastic polymers. Homopolymers and copolymers are in principle suitable as thermo-plastic polymers. Copolymers of propylene and ethylene or of ethylene or propylene and other olefins having 4 to 10 carbon atoms, or co- or terpolymers of styrene and smaller proportions of butadiene, alpha-methylstyrene, acrylonitrile, vinylcarbazole or esters of acrylic or methacrylic or itaconic acid are particularly worthy of mention in the context. The lower substrate layer of the multilayer laminated material according to the invention may also comprise said polymers in recycled form in amounts of up to 60% by weight, based on the total weight of the lower substrate layer, for improving the cost-efficiency of its production.

According to the invention, the term polyoxymethylene (POM) is understood as meaning homopolymers as well as copolymers of aldehydes, such as formaldehyde or acetaldehyde, but preferably of cyclic acetals. For POM, it is characteristic that repeating carbon-oxygen bonds always typify the appearance of the molecular chain. The melt flow index (MI) of POM is usually in the range from 5 to 50 g/10 min, preferably from 5 to 30 g/10 min, measured according to ISO 1133 at a temperature of 230° C. and under a load of 2.16 kg.

If polyester is to be used for the lower substrate layer of the multilayer laminated material according to the invention, polyethylene terephthalate (PET) or polybutylene terephthalate (PBT) are preferred for this purpose. Both are high-molecular-weight esterification products of terephthalic acid and, respectively, ethylene glycol and butylene glycol. Polyesters particularly suitable according to the invention have an MI in the range from 5 to 50 g/10 min, preferably from 5 to 30 g/10 min, measured according to DIN 1133 at a temperature of 230° C. and under a load of 2.16 kg.

Suitable copolymers of styrene for the lower substrate layer of the multilayer laminated material are in particular copolymers comprising up to 45% by weight, preferably comprising up to 20% by weight, of acrylonitrile incorporated in the form of polymerized units. Such copolymers typically have an MI in the range from 1 to 25 g/10 min, preferably from 4 to 20 g/10 min, measured according to DIN 1133 at a temperature of 230° C. and under a load of 2.16 kg.

Further terpolymers of styrene comprise up to 35% by weight, in particular up to 20% by weight, of acrylonitrile incorporated in the form of polymerized units and up to 35% by weight, preferably up to 30% by weight, of butadiene. Such terpolymers are also referred to as ABS for short and typically have an MI in the range from 1 to 40 g/10 min, preferably from 2 to 30 g/10 min, measured according to DIN 1133 at a temperature of 230° C. and under a load of 2.16 kg.

Also used as further thermoplastic polymers for the lower substrate layer of the multilayer laminated material according to the invention are in particular polyolefins, such as PE and PP, of which PP is particularly preferably used. According to the invention, PP is understood as meaning homopolymers as well as copolymers of propylene. Copolymers comprise minor amounts of monomers copolymerizable with propylene, such as 1-olefins having 2 or 4 to 8 carbon atoms. If required, two or more comonomers may also be used.

Homopolymers of propylene or copolymers of propylene and up to 50% by weight of further 1-olefins having up to 8 carbon atoms are to be mentioned as thermoplastic polymers particularly suitable for the lower substrate layer of the multilayer laminated material. Such copolymers are usually random copolymers but may also be block copolymers.

The polymerization for the preparation of PP can usually be effected under a pressure in the range from 1 to 100 bar (from 0.1 to 10 MPa) in suspension or in the gas phase and in the presence of a Ziegler-Natta catalyst system. Those catalyst systems which, in addition to a titanium-containing solid component, also comprise cocatalysts in the form of organic aluminum compounds and electron donor compounds are preferred.

Ziegler-Natta catalyst systems comprise as a rule a titanium-containing solid component, in particular halides or alcoholates of trivalent or tetravalent titanium, and also a halogen-containing magnesium compound, inorganic oxides, such as silica gel, as support material and electron donor compounds. In particular, carboxylic acid derivatives or ketones, ethers, alcohols or organosilicon compounds may be mentioned as electron donor compounds.

The titanium-containing solid component can be prepared by known processes. It is preferably prepared by a process which is described in more detail in DE 195 29 240.

Cocatalysts suitable for the Ziegler-Natta catalyst systems are, in addition to trialkylaluminum, also those compounds in which an alkyl group is replaced by an alkoxy group or by a halogen atom, such as chlorine or bromine. The alkyl groups may be identical or different. Linear or branched alkyl groups are also suitable. Trialkylaluminum compounds whose alkyl groups comprise 1 to 8 carbon atoms, for example triethylaluminum, triisobutylaluminum, trioctylaluminum or methyldiethylaluminum or mixtures thereof, are preferably used according to the invention.

The preparation of PP can, however, also be effected in the presence of metallocene as a catalyst. Metallocenes are to be understood as meaning complex compounds having a layer structure and comprising metals from the subgroups of the Periodic Table of the Elements plus organic, preferably aromatic, ligands. For their use for the preparation of PP, the metallocene complexes are expediently applied to a support material. The inorganic oxides which are also used for the preparation of the titanium-containing solid component in Ziegler-Natta catalysts have proven useful as support material.

Metallocenes usually used comprise, as a central atom, titanium, zirconium or hafnium, of which zirconium is preferred. The central atom is linked via a pi bond to at least one pi system which is embodied by a cyclopentadienyl group. The cyclopentadienyl group is equipped in the vast majority of cases with additional substituents, by means of which the activity of the catalyst can be controlled. Preferred metallocenes comprise central atoms which are bonded via two identical or different pi bonds to two pi systems which may simultaneously also be part of corresponding heteroaromatic systems.

In principle, any compound which can convert the neutral metallocene into a cation and can stabilize it is suitable as a cocatalyst for the metallocene. In addition, the cocatalyst or the anion formed from it should not undergo any further reactions with the metallocenium cation formed, which is stated in EP 427 697. The preferably used cocatalyst is an aluminum compound and/or a boron compound.

The boron compound preferably has the formula $R^{18}_x NH_{4-x} BR^{19}_4$, $R^{18}_x PH_{4-x} BR^{19}_4$, $R^{18}_3 CBR^{19}_4$ or $BR^{19}_3$ where x is a number from 1 to 4, preferably 3, the radicals $R^{18}$ are identical or different, preferably identical, and are $C_1$-$C_{10}$-alkyl or $C_6$-$C_{18}$-aryl, or two radicals $R^{18}$, together with the atoms linking them, form a ring, and the radicals $R^{19}$ are identical or different, preferably identical, and are $C_6$-$C_{18}$-aryl which may be substituted by alkyl, haloalkyl or fluorine. In particular, $R^{18}$ is ethyl, propyl, butyl or phenyl and $R^{19}$ is phenyl, pentafluorophenyl, 3,5-bistrifluoromethylphenyl, mesityl, xylyl or tolyl. Boron compounds as a cocatalyst for metallocenes are described in EP 426 638.

A preferably used cocatalyst is an aluminum compound, such as alumoxane and/or an alkylaluminum.

A particularly preferably used cocatalyst is an alumoxane, in particular of the linear type or of the cyclic type, it also being possible for organic radicals which are identical or different and may be hydrogen or a $C_1$-$C_{20}$-hydrocarbon group, such as a $C_1$-$C_{18}$-alkyl group, a $C_6$-$C_{18}$-aryl group, or benzyl, to occur in both compounds.

The lower substrate layer of the multilayer laminated material according to the invention may be present as an injection molded, as an extruded or as a pressed sheet in different thicknesses and sizes. Preferred layer thicknesses for the lower substrate layer are in the range from 0.5 to 10 mm, particularly preferably from 1 to 5 mm.

The lower substrate layer can, however, also consist of metal. Pure metals but also metal alloys are advantageously used as the metal. Examples of suitable metals are iron, chromium, nickel, copper, aluminum, brass, zinc, tin, silver and gold.

The lower substrate layer may also be a combination of plastic and metal, for example a metal plate comprising stainless steel, which is preferably about 0.2 mm thick, can be laminated with an adhesive film (hotmelt) in an amount of about 30 g/m² and with a film or sheet comprising metallocene polymer in a double-belt press (e.g. from Hymmen) at a temperature of 160° C., under a pressure of 20 bar and with a throughput speed of 4 m/min. A sheet comprising a thermoplastic or comprising a thermosetting plastic can also be provided with a thin layer of metal, for example of aluminum, under reduced pressure by vapodeposition, which leads to particular optical effects.

According to the invention, an intermediate layer of a soft material is arranged on the top of the lower substrate layer. In particular, elastomers are used as soft material. The term elastomers covers in principle those synthetic and natural plastics which have rubber-elastic properties at room temperature, i.e. which initially yield under mechanical action due to pressure or tension and subsequently, on elimination of the mechanical action, spring back again to their starting position. This particular property of the elastomers is the result of different mobility of the molecular chain in certain regions along their longitudinal extension, and is therefore a description of the temperature dependence of the physical state, for which the glass transition temperature $T_g$ serves as a measured variable. Elastomers generally have a glass transition temperature $T_g$ of lower than 0° C.

In particular, the flexible material suitable for the multilayer laminated material according to the instant invention comprises a mix of a crystalline polymer fraction and an elastomeric fraction, whereby the crystalline fraction is present in an amount of about 5 to 25% by weight and the elastomeric fraction is present in an amount of about 75 to 92% by weight, both calculated on total weight of the mix.

The crystalline fraction of the mix comprises a propylene homopolymer, having solubility in xylene at room temperature of less than 10% by weight, or the crystalline fraction comprises a copolymer of propylene and another linear or branched olefins having 2 or 4 to 10 carbon atoms, which copolymer comprises at least 85% by weight of propylene units and which copolymer has a solubility in xylene at room temperature of less that 15% by weight.

The elastomeric fraction of the mix comprises one or more elastomeric copolymers of ethylene with propylene or a $CH_2=CHR$ α-olefin, where R is a $C_2$-$C_8$ alkyl radical, and optionally minor quantities of a diene, or a copolymer of ethylene with propylene and said α-olefin, and optionally minor quantities of a diene, said copolymers containing 50% by weight or more of a fraction soluble in xylene at room temperature.

The flexible material suitable for the multilayer laminated material according to the instant invention has in particular a flexural modulus of lower than 60 MPa and a Shore A hardness of lower than 90.

In particular, the flexible material suitable for the multilayer laminated material according to the instant invention comprising the mix as described before are commercially available under the trade name SOFTELL. A preferably suitable flexible material has a preferred flexural modulus in the range from 15 to 50 MPa and a Shore A hardness in the range from 60 to 80 and a glass transition temperature $T_g$ of about less than minus 18° C., preferably minus 20° C. or less.

Measurement Methods:

The intrinsic viscosity is determined in tetrahydronaphthalene at a temperature of 135° C.

The flexural modulus and the glass transition temperature $T_g$ are determined by way of a device for dynamic-mechanical measurements DMTA of Polymer Laboratories under the following conditions:

Frequency measure: 1 Hz;
Scanning temperature: 2 K/min.

The polymer sample to be analyzed is made up of a 40×10×1 mm plaque taken from a sheet obtained by pressure molding with Carver press at a temperature of 200° C., under a pressure of 10 tons for a time period of 10 min, followed by subsequent cooling down at 100 K/min.

Shore A hardness is determined by ASTM D 2240.

The solubility at room temperature in % by weight, whereby room temperature means about 25° C., is determined by dissolving 2.5 g polymer in 250 ml xylene at a temperature of 135° C. under agitation. After 20 min, the solution is cooled down to 25° C. under stirring, thereafter it was allowed to settle for a time period of 30 min. Then, the precipitate was filtered with filter paper, the solution was evaporated under nitrogen and the residue was dried under vacuum at 80° C. until constant weight was reached. Thereafter, the weight percent of polymer soluble in xylene was calculated.

The fibrous intermediate layer of thermoplastic polymer expediently has a weight per unit area in the range from 10 to 200 g/m$^2$ and is provided with a solvent-free adhesive in an amount of from 5 to 200 g/m$^2$. According to the invention, it increases the adhesive strength or the bonding strength compared with the pure adhesive film by about 35%. A woven textile fabric or a tangled fiber web or a felt-like fiber layer can expediently be used as the fibrous intermediate layer.

In principle, all the materials which have already been described as being suitable and particularly suitable for the lower substrate layer can be used as thermoplastic material for the fibrous intermediate layer. A PP which is prepared in the presence of metallocene as a catalyst and which has an MI in the range from 10 to 60 g/10 min, measured according to DIN 1133 at a temperature of 230° C. under a load of 2.16 kg, is preferably used as the thermoplastic material.

The layer thickness of the fibrous intermediate layer is preferably in the range from 0.01 to 4 mm, particularly preferably from 0.1 to 2 mm, very particularly preferably from 0.2 to 1 mm.

According to the invention, a synthetic adhesive which is liquid under the action of heat but normally solid and which is also referred to in technical language as hotmelt is used as the solvent-free adhesive. Examples of such adhesives are so-called PU adhesives based on copolyamides and modified polypropylene. Polyethylene or amorphous poly-alpha-olefins or ethylene-vinyl acetate copolymers can also be used as further base polymers for suitable adhesives. The adhesives may additionally comprise antioxidants or UV stabilizers. In addition, they occasionally also have proportions of resins, such as rosin, terpene or other hydrocarbon resins.

Depending on the field of use, the adhesives are chosen with regard to the adhesion properties on the base materials, the processing temperature, the heat distortion resistance, the chemical stability and the hardness. Hotmelt adhesives are offered in granular form, as powder, as film or as rods (also "candles"). PA hotmelt adhesives are produced partly from renewable raw materials and are in principle compostable. The adhesion particularly to porous materials, such as fabric, leather, wood and woven textiles, and the relatively advantageous price are responsible for the wide use of the relevant adhesives.

The top layer of the multilayer laminated material according to the invention is a layer of glass. In principle, all types of glass are suitable for this purpose, but heat-stable glass is particularly suitable. Glasses particularly preferred according to the invention are quartz glasses having a chemical composition of about 98% of pure $SiO_2$ or quartz glasses to which corresponding additives were added in small amounts for the formation of sodium or calcium silicates, in order thereby to reduce the high melting point of the quartz glass of 1700° C. and thus to obtain a thermally deformable and readily further processable material. Glass which was developed under the name Jenaer Glas by Schott and in which the oxides of sodium and calcium are to a large extent replaced by $B_2O_3$, by $Al_2O_3$ and by BaO is furthermore suitable. Such glasses possess improved chemical resistance and have a reduced coefficient of expansion.

Glasses which comprise small amounts of fluorite, cryolite or sodium silico-fluoride and thus have a whitish opacity but nevertheless have good translucence are furthermore suitable according to the invention. Ground glasses which are etched with the aid, of hydrofluoric acid or are treated by means of a sandblasting blower and thus have a strongly light-scattering effect may also be very suitable according to the invention.

The invention also relates to a process for the production of the laminated material according to the invention by the injection molding technique. In order to bond the lower substrate layer, which typically has a layer thickness in the range from 0.01 to 20 mm, and the glass to give a firmly adhering laminate, in the injection molding technique the material for the lower substrate layer is introduced into one half of the injection mold and the glass layer laminated on one side with the fibrous intermediate layer and the adhesive film is introduced into the other half of the injection mold. After the mold has been closed, the soft material (Softell) is injected at a temperature in the range from 150 to 330° C. and under a pressure of from 5 to 2500 bar (=from 0.5 to 250 MPa) between the lower substrate layer and the glass layer. The mold temperature is as a rule from 8 to 160° C. on both sides. After the soft material has been injected under said conditions, the mold is cooled to ambient temperature. The cooling time for this is in the range from 0.01 to 5.0 min.

According to another process variant, a prepared laminate having a layer thickness in the range from 0.02 to 3.0 mm or alternatively individual sheets (overlay, decorative paper, resin) is or are first placed in one half of an injection molding chamber. A glass sheet which is laminated with a nonwoven (about 30 g/m$^2$; metallocene polymer, ®Novolen) is introduced into the other half of the injection molding chamber. After the mold has been closed, the soft material (e.g. Softell) is then injected at a temperature of at least 170° C. and a pressure of at least 50 bar (5 MPa) in between into the chamber.

In the case of the lamination of the glass sheet, it is possible to adopt a procedure in which the glass sheet is first placed in a compression mold. At the surrounding edge, an adhesive film in an amount corresponding to about 25 g/m$^2$ is applied, as well as a nonwoven (e.g. Metocene fabric; e.g. 30 g/m$^2$). The glass sheet and the laminated materials are then kept at a temperature of at least 50 to 330° C. and a pressure of at least 5 bar over a duration of at least 2 s. The glass sheet thus laminated is now ready to form an interlocking bond to a thermoplastic polymer or to a metal.

In a compression process, the same process takes place in principle. The only difference is that the soft material (e.g. Softell) is introduced in granular form between the individual laminated materials introduced in the layer sequence and the laminated glass layer and subjected to at least 5 bar pressure and a press temperature of at least 100° C. on both sides and a compression time of at least 30 s.

The same procedure has proven outstanding in practice in the case of injection stamping and transfer molding.

Owing to their structure, the multilayer laminates according to the invention are absolutely flat even under a thermal load of <50° C. over a period of 40 days. The soft material completely compensates for the build up of internal stresses and the effects of the different coefficients of thermal expansion of the different materials in the multilayer laminate, in particular in the region of the edges. The intermediate layer of soft material, which may have a layer thickness in the range from 0.02 to 10 mm, completely absorbs the distortion or the shrinkage of the plastic or of the metal relative to the glass.

The working examples described below can be varied according to needs and requirement profiles. This means that customary plastics or metals can be bonded to glass in an interlocking manner and completely without destruction. The results of Examples 1 to 8 according to the invention are compared with the results of the comparative examples at the end in Table I.

EXAMPLE 1

Bonding of Glass—Soft Material—Aluminum Foil

A carefully laminated glass sheet (glass sheet/adhesive film/nonwoven/woven fabric; total thickness 2 mm) was placed in one side of an injection mold. A laminated aluminum foil (aluminum foil/adhesive film/nonwoven-woven fabric; total thickness 0.4 mm) was placed in the other half of the injection mold.

After the mold had been closed, the soft material was injected at a temperature of 180° C. under an injection pressure of 100 bar between the two layers. After a cooling time of 10 s, the complete multilayer laminate was removed from the mold.

The result shows an interlocking bond of all materials with one another.

EXAMPLE 2

Bonding of Glass—Soft Material—Stainless Steel Foil

A previously laminated glass sheet (glass sheet/adhesive film/nonwoven-woven fabric; total thickness 2 mm) was placed in one side of the injection mold. A laminated stainless steel foil (stainless steel foil/adhesive film/nonwoven-woven fabric; total thickness 0.3 mm) was placed in the other half of the injection mold.

After the mold had been closed, soft material (SOFTELL) was injected at a temperature of 200° C. under an injection pressure of 120 bar between the two layers.

After a cooling time of 12 s, the complete multilayer laminate was removed from the mold. The result showed an interlocking bond of all materials with one another.

EXAMPLE 3

Bonding of Glass—Soft Material—Polyamide

A previously laminated glass sheet (glass sheet/adhesive film/nonwoven-woven fabric; total thickness 2 mm) was placed in one side of an injection mold. After the mold had been closed, soft material (SOFTELL) was injected onto the glass sheet in the first step.

After the mold had been opened, a woven fabric (open-pore; 30 g/m$^2$) was placed on the surface of the soft material, after which the mold was closed again.

Thereafter, polyamide (PA 66) was injected onto the previously introduced woven fabric at a temperature of 240° C. under a pressure of 100 bar. After a cooling time of 15 s, the complete multilayer laminate was removed from the mold. The result showed an interlocking bond of all materials with one another.

EXAMPLE 4

Bonding of Glass—Soft Material—Polyurethane/PU

A previously laminated glass sheet (glass sheet/adhesive film/nonwoven-woven fabric; total thickness 4 mm) was placed in one side of a compression mold. Soft material (SOFTELL) was placed in the form of a film (thickness=0.5 mm) around the laminated glass sheet.

After the compression mold had been closed, polyurethane/PU was introduced under a pressure of 2 bar into the compression chamber.

After a cooling time of 15 s, the complete multilayer laminate was removed from the mold. The result showed an interlocking bond of all materials with one another.

EXAMPLE 5

Bonding of Glass—Soft Material—Polypropylene (Filled/Unfilled/Foamed)

A previously laminated glass sheet (glass sheet/adhesive film/nonwoven/woven fabric; total thickness 3 mm) was placed in one side of an injection mold. A polypropylene sheet (thickness=3 mm) was placed in the other mold half. After the mold had been closed, the soft material was injected at a temperature of 120° C. and a pressure of 50 bar between the introduced glass sheet and polypropylene sheet.

After a cooling time of 15 s, the complete multilayer laminate was removed from the mold. The result showed an interlocking bond of all materials with one another.

EXAMPLE 6

Bonding of Glass—Soft Material—Copper Foil

A previously laminated glass sheet (glass sheet/adhesive film/nonwoven-woven fabric; total thickness 3 mm) was placed in one side of an injection mold. A laminated copper foil (copper foil/adhesive film/nonwoven-woven fabric; total thickness 0.3 mm) was placed in the other half of the injection mold.

After the mold had been closed, soft material (SOFTELL) was injected at a temperature of 180° C. under an injection pressure of 80 bar between the two layers.

After a cooling time of 10 s, the complete multilayer laminate was removed from the mold. The result showed an interlocking bond of all materials with one another.

EXAMPLE 7

Bonding of Glass—Polyamide (PA)—Aluminum Foil

A glass sheet carefully laminated beforehand (glass sheet/adhesive film/nonwoven-woven fabric: total thickness 3 mm) was placed in one side of the injection mold.

A previously laminated aluminum foil (aluminum foil/adhesive film/nonwoven-woven fabric; total thickness about 0.5 mm) was placed in the other side of the mold.

After the mold had been closed, polyamide (PA 66) was injected at a temperature of 260° C. under an injection pressure of 120 bar between the two layers. After a cooling time of 15 s, the multilayer laminate was removed from the mold. The result showed an interlocking bond of all materials with one another.

EXAMPLE 8

Bonding of Glass—ABS—Steel Foil

A previously laminated glass sheet (glass sheet/adhesive film/nonwoven-woven fabric; total thickness 3 mm) was placed in one side of the injection mold. A previously laminated steel foil (steel foil/adhesive film/nonwoven-woven fabric; total thickness 2 mm) was placed in the other side of the injection mold.

After the mold had been closed, ABS was injected at a temperature of 240° C. under an injection pressure of 100 bar between the two layers.

After a cooling time of 15 s, the multilayer laminate was removed from the mold. The result showed an interlocking bond of all materials with one another.

COMPARATIVE EXAMPLE 1

Bonding: Glass—Primer—PVC

A glass edge previously coated with a primer/adhesion promoter was placed in a compression mold. Thereafter, PVC was pressed onto the glass edge at a temperature of 180° C. under a pressure of 85 bar.

After a cooling time of 15 s, the laminate was removed from the mold. The result showed an interlocking bond of the materials with one another.

COMPARATIVE EXAMPLE 2

Bonding of Glass—Primer—TPE—Primer—Aluminum Foil

A glass edge previously coated with a primer/adhesion promoter and an aluminum foil treated in the same manner were placed in each case in one side of a compression mold.

TPE was then injected at a temperature of 200° C. under a pressure of 80 bar between the two layers.

After a cooling time of 20 s, the laminate was removed from the mold. The result showed an interlocking bond of the materials with one another.

The results of all examples and comparative examples are compared with one another in the table.

Tests:
Water storage: temperature: 90° C.; duration: 40 days
Temperature storage: hot air 150° C.; duration: 40 days
Peeling test: angle: 900; force: 15 N
Elongation at break: greater than 500% (soft material)
Odor development at 75° C. (voluntary laboratory assistant)

TABLE

|  | Water 90°; 40 d | Hot air 150° C.; 40 d | Peeling test 90°: 15 N | Elongation at break 500% |
| --- | --- | --- | --- | --- |
| Example 1 | ++ | ++ | ++ | ++ |
| Example 2 | ++ | ++ | ++ | ++ |
| Example 3 | ++ | ++ | ++ | ++ |
| Example 4 | ++ | ++ | ++ | ++ |
| Example 5 | ++ | ++ | ++ | ++ |
| Example 6 | ++ | ++ | ++ | ++ |
| Example 7 | ++ | ++ | ++ | ++ |
| Example 8 | ++ | ++ | ++ | ++ |
| Comparative example 1 | −− | −− delamination | + | −− |
| Comparative example 2 | + | −− delamination | + | −− |

Explanation: −− = poor
+ = good
++ = very good

The odor order test was not passed by either of the two comparative examples owing to pronounced formaldehyde formation. However, Examples 1 to 8 showed no odor nuisance.

I claim:
1. A multilayer laminated material comprising:
(a) a top layer of glass, wherein the top layer of glass forms a first outer layer;

(b) a fibrous intermediate layer of thermoplastic polymer arranged in contact with the top layer of glass, wherein the fibrous intermediate layer comprises a solvent-free adhesive material which is liquid under the action of heat but normally solid;

(c) an intermediate layer comprising an elastomer which, wherein the elastomer comprises a mix of:
  (i) about 5 to 25% by weight, based on total weight of the mix, of a crystalline fraction, wherein the crystalline fraction comprises a polypropylene homopolymer or a copolymer of propylene wherein the copolymer comprises at least 85 wt. %, based upon the total weight of the copolymer, of propylene derived units and no more than 15 wt. %, based upon the total weight of the copolymer, of units derived from a linear or branched olefin having 2 or 4 to 10 carbon atoms; and
  (ii) about 75 to 92% by weight, based on total weight of the mix, of an elastomeric fraction,
  wherein the elastomeric fraction comprises a copolymer of ethylene with propylene or a $CH_2$=CHR α-olefin, where R is a $C_2$-$C_8$ alkyl radical, and optionally minor quantities of a diene, or a copolymer of ethylene with propylene and said α-olefin, and optionally minor quantities of a diene, and
  wherein the elastomer has rubber-elastic properties at room temperature and has a glass transition temperature $T_g$ of lower than 0° C. and a flexural modulus lower than 60 MPa; and (d) a lower substrate layer of a plastic, a metal or a combination of plastic and metal, wherein the intermediate layer is arranged on top of the lower substrate.

2. The multilayer laminated material according to claim 1, wherein the lower substrate layer is a thermoplastic or a thermosetting plastic.

3. The multilayer laminated material according to claim 1, which comprises, as the plastic of the lower substrate layer a thermoplastic polymer selected from the group consisting of polypropylene (PP), polyethylene (PE), polyvinyl chloride (PVC), polysulfones, polyether ketones, polyesters, polycycloolefins, polyacrylates, polymethacrylates, polyamides, polycarbonate, polyurethanes, polyacetals, polystyrene (PS) and blends of these.

4. The multilayer laminated material according to claim 3, wherein the thermoplastic polymer of the lower substrate layer additionally comprises an amount of from 1 to 60% by weight, based on the weight of the lower substrate layer, of reinforcing fillers.

5. The multilayer laminated material according to claim 1, wherein the lower substrate layer is an injection molded or extruded or pressed sheet which has a layer thickness in the range from 1 to 10 mm.

6. The multilayer laminated material according to claim 1, wherein the lower substrate layer is a metal or a combination of plastic and metal.

7. The multilayer laminated material according to claim 1, wherein the fibrous intermediate layer of thermoplastic polymer has a weight per unit area in the range from 10 to 200 $g/m^2$ and is provided with the adhesive material in an amount of from 5 to 200 $g/m^2$, wherein the adhesive material is solvent free.

8. The multilayer laminated material according to claim 1, which comprises, as the fibrous intermediate layer, a woven textile fabric or a tangled fiber web or a felt-like fiber layer.

9. The multilayer laminated material according to claim 1, wherein the thermoplastic polymer of the fibrous intermediate layer is a polypropylene which is prepared in the presence of metallocene as a catalyst and which has a melt flow index $MI_{(2.16/230° C.)}$ in the range from 10 to 60 g/10 min, measured according to DIN 1133 at a temperature of 230° C. and under a load of 2.16 kg.

10. The multilayer laminated material according to claim 1, wherein the layer thickness of the fibrous intermediate layer is in the range from 0.01 to 4 mm.

11. The multilayer laminated material according to claim 1, wherein the fibrous intermediate layer is nonwoven and is surrounding the glass layer at its outer edge as a frame.

12. A process for the production of a multilayer laminated material according to claim 1, comprising introducing the material for the lower substrate layer into one half of an injection mold and the glass layer into the other half of the injection mold, wherein the glass layer is laminated beforehand on one side with the fibrous intermediate layer and the adhesive material, and wherein, after the mold has been closed, the elastomer is injected at a temperature in the range from 150 to 330° C. and under a pressure of from 5 to 2500 bar (0.5 to 250 MPa) between the lower substrate layer and the glass layer.

13. A process for the production of a multilayer laminated material according to claim 12, in which the glass is laminated at the edges.

14. The process according to one or according to claim 12, wherein the mold temperature is set in the range from 8 to 160° C. on both sides.

15. The process according to claim 12, wherein, after the elastomer has been injected, the mold is cooled to ambient temperature, the cooling time being in the range from 0.01 to 5.0 min.

* * * * *